(12) United States Patent
Du et al.

(10) Patent No.: US 11,866,538 B2
(45) Date of Patent: Jan. 9, 2024

(54) POLYURETHANE-ACRYLATE WATER REPELLANT PREPARED BY DOUBLE BONDS IN SIDE CHAIN

(71) Applicant: Jiangnan University, Wuxi (CN)

(72) Inventors: Jinmei Du, Wuxi (CN); Shaofei Wang, Wuxi (CN); Changhai Xu, Wuxi (CN); Ankang Yao, Wuxi (CN); Panfei Zhou, Wuxi (CN); Zengyuan Pang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 838 days.

(21) Appl. No.: 16/938,006

(22) Filed: Jul. 24, 2020

(65) Prior Publication Data

US 2020/0354498 A1   Nov. 12, 2020

Related U.S. Application Data

(63) Continuation of application No. PCT/CN2019/077205, filed on Mar. 6, 2019.

(30) Foreign Application Priority Data

Jan. 28, 2019 (CN) .......................... 201910077947.5

(51) Int. Cl.
    *C08F 293/00* (2006.01)
    *C09D 5/02* (2006.01)
    *C09D 153/00* (2006.01)
    *D06M 15/564* (2006.01)

(52) U.S. Cl.
    CPC ............ *C08F 293/005* (2013.01); *C09D 5/02* (2013.01); *C09D 153/00* (2013.01); *D06M 15/564* (2013.01); *D06M 2200/12* (2013.01)

(58) Field of Classification Search
    CPC .................................................. C08F 290/147
    See application file for complete search history.

(56) References Cited

U.S. PATENT DOCUMENTS

2007/0106019 A1*  5/2007  Schwarte ............ C09J 151/003
                                                              427/407.1

FOREIGN PATENT DOCUMENTS

| CN | 101475679 A | 7/2009 |
| CN | 104611933 A | 5/2015 |
| CN | 105064036 A | 11/2015 |
| CN | 108978226 A | 12/2018 |

OTHER PUBLICATIONS

PCT/CN2019/077205 ISA210 ISR Mail Date Oct. 9, 2019.

\* cited by examiner

*Primary Examiner* — Jeffrey C Mullis
(74) *Attorney, Agent, or Firm* — IPRO, PLLC; Na Xu

(57) ABSTRACT

The disclosure provides a polyurethane-acrylate water repellant prepared by double bonds in the side chain, and belongs to the technical field of environment-friendly polymers. The disclosure introduces the carbon-carbon double bonds into the polyurethane side chain through a carbon-carbon double bond-containing dihydroxy micromolecular chain extender having a carbon chain structure to adjust the number of double bonds on a waterborne polyurethane chain segment participating in a free radical polymerization with acrylate monomers, thereby generating a branched structure, and improving the compatibility of polyurethane and acrylate; the fastness of a fabric is increased by combining an oxime blocking structure with the fabric. The polyurethane-acrylate water repellant prepared by the disclosure is non-toxic and low in VOC, and the finished fabric has significantly improved physical and chemical properties, and good application prospects.

14 Claims, 1 Drawing Sheet

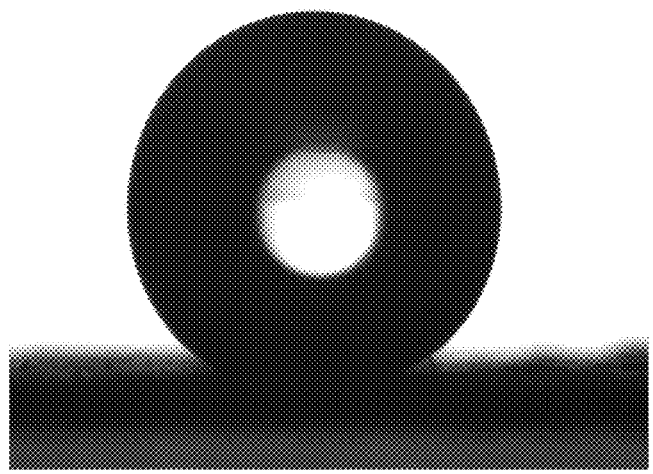

POLYURETHANE-ACRYLATE WATER REPELLANT PREPARED BY DOUBLE BONDS IN SIDE CHAIN

TECHNICAL FIELD

The disclosure relates to a polyurethane-acrylate water repellant prepared by double bonds in the side chain, and belongs to the technical field of environment-friendly polymers.

BACKGROUND

With the development and progress of society, in the application of textiles, people have higher and higher requirements on the wearability of textiles. They are not only limited to wearing comfort, but also have functions such as water repellant, anti-ultraviolet, and flame retardant functions. Therefore, more and more attention is being paid to research and development of functional textiles from people. Water-repellant textiles are a kind of functional textiles, which have waterproof, anti-fouling and self-cleaning functions. The surface of the fabric after water-repellant finishing cannot be wetted by water, but it still maintains the water vapor and air permeability of the fabric and meets the wearing requirements. Fluorine has a low surface energy, and it also has an oil-repellant effect while repelling water. When used, it is difficult to be wetted or attached by various liquids, and it has high thermal stability and chemical stability. Although fluorinated compounds have the characteristics of low concentration and high efficiency, the cost is high, the color light of the fabric will be affected during washing, and as more and more attention is being paid to environmental protection, there is a global ban on ammonium perfluorooctanoate (PFOA) and perfluorooctane sulfonyl compound (PFOS) containing waterproof agents, and a fluorine-free waterproof agent is highly recommended. Therefore, the research and development of a non-toxic, low VOC content, and environment-friendly fluorine-free water repellant to replace the current fluorine-containing water repellant are the current international development trend.

Waterborne polyurethane (WPU) has the advantages of non-flammability, low cost, environmental protection and the like. It has been widely used in water-based inks, coatings, adhesives, leather finishing agents and other fields. However, the waterborne polyurethane has the disadvantages of poor water resistance, low gloss fastness, high price and the like, which limits its wide application. Researchers mostly use graft modification of acrylate monomers and polyurethane to prepare a water repellant. In the preparation of a polyurethane/acrylate water repellant, due to the poor compatibility of the two components in the polymer, the waterborne polyurethane and acrylate monomers are bonded with chemical bonds by mostly using a chemical modification method so as to improve their fastness. At present, what is mostly used is to introduce active double bonds at the end of the polyurethane macromolecular chain segment, and then to perform a free radical polymerization with the acrylate monomers, thereby improving the compatibility of the polyurethane/acrylate components. According to the reaction characteristics of polyurethane isocyanate radical, the most common method for introducing active double bonds in its molecular chain segment is to add monohydroxy unsaturated organic compounds such as hydroxymethyl acrylate and hydroxyethyl acrylate after forming a polyurethane prepolymer, and use its hydroxyl to block the isocyanate terminated group of the prepolymer, that is, carbon-carbon double bonds are introduced at the end of the macromolecular chain segment; another method is to introduce the carbon-carbon double bonds inside the polyurethane molecular chain segment, add unsaturated organic compounds containing active hydroxyls at both ends, such as ethylene glycol, butenediol, and 3-hexene-1,6-diol, and use active hydroxyls to introduce the above monomers in the macromolecular chain segment in the form of chain extension.

The above two methods of introducing the carbon-carbon double bonds solve the problem of poor polyurethane/acrylate compatibility to a certain extent, but there are also great disadvantages. The former is to introduce the carbon-carbon double bonds at the end of the polyurethane chain segment, because the isocyanate radical group has been partially blocked, it is difficult to obtain polyurethane molecules with a large average molecular weight; at the same time, due to the limitation of a molecular structure, at most two active double bonds can only be obtained on the obtained polyurethane molecule, so that the number of grafted acrylate monomers is limited. Although the latter introduces more active double bonds and obtains the large molecular weight polyurethane to a certain extent, which improves the polyurethane/acrylate compatibility, the large molecular weight polyurethane molecular chain will reduce the carbon-carbon double bond activity, and graft polymerization with acrylate monomers is not easy to occur. Therefore, there is an urgent need to develop a novel macromolecular water repellant with high double bond activity.

SUMMARY

Aiming at the above problems, the disclosure introduces carbon-carbon double bonds in the polyurethane molecular side chain by a carbon-carbon double bond-containing dihydroxy micromolecular chain extender (Formula II), and more carbon-carbon double bonds are introduced while increasing the molecular weight, so that the carbon-carbon double bonds in the side chain are exposed at the outer end, which are convenient to perform a free radical polymerization with the double bonds of acrylate monomers. In order to solve the problem of poor fastness to washing of the traditional water repellant, the disclosure uses oxime organic compounds to block the isocyanate radical exposed at the end of a polyurethane prepolymer, and a deblocking reaction can occur at a certain temperature. The isocyanate radical, released in the curing and drying process, by the fabric finished by the water repellant prepared by the disclosure, chemically reacts with other groups containing active hydrogen and fabrics to establish a cross-link between polymer molecules and a chemical bond with the fabric, thereby giving the product a high fastness.

A first object of the disclosure is to provide a polyurethane-acrylate water repellant. In the water repellant, carbon-carbon double bonds are introduced in the polyurethane side chain, and its structural formula is shown in formula (I):

Formula (I)

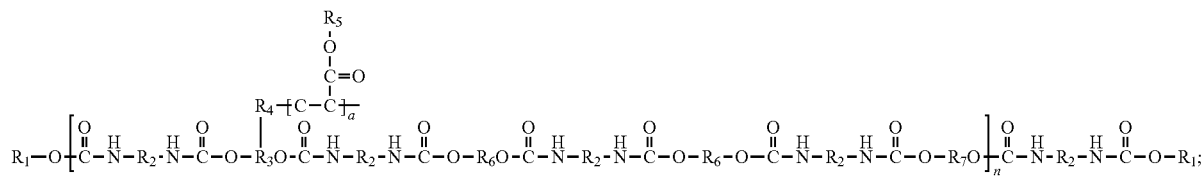

wherein $R_1$ is an oxime blocking group; $R_2$ is derived from a diisocyanate monomer; $R_3$ is selected from alkyl, phenyl, cyclic group, acyl, ester group, carbonyl, and ether group having any number of carbon atoms; $R_4$ is selected from alkyl, cyclic group and its derivatives, phenyl and its derivatives; $R_5$ is a carbon chain having 1-18 carbon atoms; $R_6$ is derived from polyether or polyol polyorganic compounds; $R_7$ is derived from a hydrophilic chain extender; a and n are natural numbers of 1-100.

In an implementation of the disclosure, $R_1$ is an oxime blocking agent structural unit; $R_2$ is an aliphatic or aromatic structural unit in the diisocyanate monomer; $R_3$ is selected from alkyl, phenyl, cyclic group, acyl, ester group, carbonyl, and ether group; $R_4$ is selected from alkyl, cyclic group and its derivatives, phenyl and its derivatives; $R_5$ is a carbon chain having 1-18 carbon atoms; $R_6$ is a polyether or polyol polyorganic compound structural unit; $R_7$ is a hydrophilic chain extender structural unit; a and n are natural numbers of 1-100.

A second object of the disclosure is to provide a method for preparing the above polyurethane-acrylate water repellant, and the method comprises:
(1) preparing a polyurethane prepolymer by using diisocyanate, part of the hydrophilic chain extender and a polymer polyol;
(2) continuously reacting the polyurethane prepolymer with a double carbon-carbon double bond-containing dihydroxy micromolecular chain extender and the remaining hydrophilic chain extender for a period of time to obtain a waterborne polyurethane emulsion with carbon-carbon double bonds in the side chain; the double carbon-carbon double bond-containing dihydroxy micromolecular chain extender being a compound shown in formula (II);
(3) adding the oxime blocking agent to block the isocyanate radical (NCO %≤0.5%);
(4) cooling, and adding a neutralizer to adjust pH to 7-8.5;
(5) adding deionized water for emulsification to obtain a waterborne polyurethane emulsion with carbon-carbon double bonds in the side chain;
(6) performing a free radical polymerization of the polyurethane emulsion with carbon-carbon double bonds in the side chain and the acrylate monomer under the condition of an initiator to obtain the polyurethane-acrylate water repellant;

Formula (II)

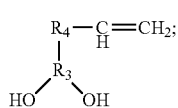

wherein $R_3$ is selected from alkyl, phenyl, cyclic group, acyl, ester group, carbonyl, and ether group having any number of carbon atoms; $R_4$ is selected from alkyl, cyclic group and its derivatives, phenyl and its derivatives.

In an implementation of the disclosure, the carbon-carbon double bond-containing dihydroxy micromolecular chain extender comprises any one or a mixture of 7-octene-1,2-diol, pentaerythritol diacrylate, 6-heptene-2,4-diol, 3-allyloxy-1,2-propanediol, glycerol methacrylate (GM), trimethylolpropane monoallyl ether, 2,2-bishydroxymethylbutanoic acid-3-hydroxy-2-(2-methacryloyloxy)-propyl ester, and 2-(3-isocyanatomethyl)-3,5,5-trimethylcyclohexylcarbamoyloxy)ethyl acrylate.

In an implementation of the disclosure, in step (1), the molar ratio of isocyanate radical to hydroxyl of the polyurethane prepolymer is 1.1-1.7.

In an implementation of the disclosure, in step (1), the hydrophilic chain extender accounts for 4%-11% of the total mass of the monomer.

In an implementation of the disclosure, in step (2), the carbon-carbon double bond-containing dihydroxy micromolecular chain extender accounts for 1%10% of the total mass of the monomer.

In an implementation of the disclosure, in step (3), the molar ratio of the blocking agent to unreacted isocyanate radical is 1.5-2.

In an implementation of the disclosure, in step (4), the neutralization degree is 80%-100%.

In an implementation of the disclosure, in step (5), the self-emulsification by adding water is obtained by stirring according to a solid content of 20%-40%.

In an implementation of the disclosure, in step (6), the mass ratio of the acrylate monomer to the solid content of polyurethane self-emulsion with carbon-carbon double bonds in the side chain is (1-4):1.

In an implementation of the disclosure, in step (6), the acrylate monomer is an acrylate having 1-18 carbon atoms in the ester group.

In an implementation of the disclosure, in step (6), the acrylate monomer is added to the waterborne polyurethane emulsion, and stirred and emulsified for a period of time, and then added with an initiator to polymerize to obtain the polyurethane-acrylate water repellant.

In an implementation of the disclosure, the diisocyanate comprises any one or a mixture of isophorone diisocyanate, toluene diisocyanate, xylylene diisocyanate, hexamethylene diisocyanate, dicyclohexylmethane diisocyanate, 4,4-diphenylmethane diisocyanate, lysine diisocyanate, 1,5-naphthalene diisocyanate, trimethylhexamethylene diisocyanate, dodecylbenzene-2,4-diisocyanate, p-phenylene diisocyanate, m-phenylene diisocyanate, diphenylmethane diisocyanate, and dicyclohexylmethane diisocyanate.

In an implementation of the disclosure, the polymer polyol comprises one or a mixture of polyether polyols and polyester polyols with a molecular weight of 300-2000: polytetrahydrofuran glycol, polyethyleneglycol adipate glycol, polyethyleneglycol sebacate glycol, poly-1,4-butanediol adipate glycol, poly-ε-caprolactone glycol, polypropylene glycol, polyethylene glycol, polycarbonate glycol, polybutadiene glycol, and acrylate polyol.

In an implementation of the disclosure, the hydrophilic chain extender comprises any one or a mixture of 2,2-dimethylolbutanoic acid, 2,2-dimethylolpropionic acid, N-methyldiethanolamine, diethylenetriamine, triethanolamine, tartaric acid, dihydroxy hemiester, dimethylolpropionic acid, dihydroxy hemiester, methyldiethanolamine, and sodium 2-[(2-aminoethyl)amino]ethanesulphonate.

In an implementation of the disclosure, the blocking agent comprises any one or a mixture of butanone oxime, butamidine oxime, acetone oxime, methyl ethyl ketoxime, formaldehyde oxime, bromophenol oxime, cyclohexanone oxime, n-heptaldehyde oxime, dimethyl glyoxime, and tetramethylcyclobutanedione monooxime.

In an implementation of the disclosure, the neutralizer comprises one or a mixture of triethylamine, ammonia, sodium hydroxide, hydrochloric acid, acetic acid, N,N-dimethylethanolamine, diethanolamine, and triethanolamine.

In an implementation of the disclosure, in step (1), the method for preparing the polyurethane prepolymer specifically comprises steps:

the polymer polyol (accounting for 79%-95% of the total mass of the monomer), the hydrophilic chain extender (accounting for 4%-11% of the total mass of the monomer), and the carbon-carbon double bond-containing dihydroxy micromolecular chain extender (accounting for 1%40% of the total mass of the monomer) are dried in vacuum at a temperature of 80-90° C. to remove water for 3-4 hours. According to the ratio of isocyanate radical to hydroxyl of 1.1-1.7, part of the hydrophilic chain extender (accounting for 30%-40% of the total amount of the hydrophilic chain extender), and the polymer polyol are taken, and added with dibutyltin dilaurate (accounting for 0.08% of the total mass of the monomer participating in the reaction), diisocyanate is added dropwise at a temperature of 70-80° C. under nitrogen protection, and the next step is executed after the —NCO % value in the reaction system reaches the theoretical value by using a di-n-butylamine method (the theoretical remaining amount of isocyanate radical≤32-36%).

In an implementation of the disclosure, step (2) specifically comprises steps:

the carbon-carbon double bond-containing micromolecular chain extender (Formula II) is added at a temperature of 60-65° C., the next step is executed after the —NCO % content in the reaction system reaches the theoretical value by using the di-n-butylamine method (the theoretical remaining amount of isocyanate radical≤12-16%). Then the remaining hydrophilic chain extender is added until the —NCO content in the reaction system reaches the theoretical value (the theoretical remaining amount of isocyanate radical≤8%).

In an implementation of the disclosure, step (3) specifically comprises steps:

the temperature is reduced to 50-60° C., the chain-extended polyurethane is blocked by adding the blocking agent (the molar ratio of blocking agent to unreacted isocyanate radical is 1.5-2), and NCO % is determined to be 0.5%, thereby completing the blocking of polyurethane.

In an implementation of the disclosure, steps (4) and (5) specifically comprise steps:

the temperature is reduced to room temperature, the neutralizer (neutralization degree: 80%-100%) is added to adjust the reaction pH (pH=7.5±0.5), and deionized water is added according to a solid content of 20%-40% and stirred at a high speed (r=1000-1600 r/min) to be self-emulsified to obtain the waterborne polyurethane self-emulsion.

In an implementation of the disclosure, step (6) specifically comprises steps:

at a temperature of 40-50° C., the acrylate monomer having 1-18 carbon atoms in the ester group is slowly added to the waterborne polyurethane emulsion (the ratio of the total mass of the acrylate monomer to the solid content of the polyurethane with the carbon-carbon double bonds in the side chain is (1-4):1, stirred under a high-speed mixer for 15-20 min (r=4000-5000 r/min), and then kept standing for 1-1.5 h, then the temperature is raised to 75-80° C., the initiator (accounting for 0.6-0.8% of the total mass of the acrylate monomer) is slowly added dropwise within 3-4 hours, the temperature is kept for 2-3 h and then reduced, and the material is discharged to obtain the polyurethane-acrylate water repellant (WPUA).

A third object of the disclosure is to prepare a hydrophobic fabric, and the fabric comprises the above polyurethane-acrylate water repellant.

In an implementation of the disclosure, the preparation process of the hydrophobic fabric comprises steps: by using a padding, drying and curing process, the fabric is emulsified by the water repellant at a padding residual ratio of 70-150% and a padding concentration of 20-180 g/L and then pre-dried at a temperature of 60-100° C. for 1-5 min and cured and padded at a temperature of 120-160° C. for 1-5 min.

The disclosure has the beneficial effects that:

1. The disclosure introduces the carbon-carbon double bonds in the polyurethane macromolecular side chain through the carbon-carbon double bond-containing dihydroxy micromolecular chain extender (Formula II), and performs a free radical polymerization of active double bonds on the polyurethane side chain and the acrylate monomer to prepare the polyurethane-acrylate water repellant. While introducing more active double bonds, the large molecular weight polyurethane is obtained, so that the number of acrylate monomers participating in the grafting reaction is increased, and the acrylate monomers cover the side end of the polyurethane molecular chain, thereby avoiding the reduction in activity of carbon-carbon double bonds on the polyurethane molecular main chain caused by the entanglement of the macromolecular chain polyurethane, increasing the content of hydrophobic groups in the molecular chain, generating a branched structure, improving the polyurethane/acrylate compatibility, and obtaining the water repellant with stable properties.

2. The disclosure uses non-toxic, low-VOC content, and environment-friendly waterborne polyurethane as an emulsifier and the acrylate monomer to prepare the water repellant; at the end of polyurethane, the isocyanate radical of polyurethane is blocked with oxime organic compounds, and a deblocking reaction occurs at a certain temperature, so that the isocyanate radical exposed at the outer end reacts with the active hydrogen groups on the fabric, and the water repellant and the fabric are cross-linked by chemical bonds to solve the problems of environment pollution of fluorine-containing water repellant and poor fastness to washing of the long carbon chain water repellant, so that the contact angle of the fabric is up to 152° and the static water contact angle of the fabric washed with a domestic washing machine 25 times is higher than 140°.

BRIEF DESCRIPTION OF FIGURES

FIG. 1: Static water contact angle diagram of fabric treated with water repellent obtained in Example 3.

DETAILED DESCRIPTION

The disclosure will be further described below in conjunction with specific examples. The examples listed are only used to explain the disclosure, not to limit the scope of the disclosure.

Example 1

Investigation of Effects of Different Molar Ratios of Isocyanate Radical to Hydroxyl on Water Repellant:
A Polyurethane-acrylate water repellant was prepared according to the following steps and the fabric was finished:
Preparation of Polyurethane-Acrylate Water Repellant:
Preparation of Waterborne Polyurethane Self-Emulsion with Carbon-Carbon Double Bonds in Side Chain:
(1) Polytetrahydrofuran (Mn=850, accounting for 95% of the total mass of hydroxyl), 2,2-dimethylolbutanoic acid (accounting for 4% of the total mass of hydroxyl), and 1,5-hexadiene-3,4-diol (accounting for 1% of the total mass of hydroxyl) were dried in vacuum at a temperature of 70° C. to remove water for 3-4 h. Under the protection of nitrogen, in the presence of dibutyltin dilaurate as a catalyst (accounting for 0.08% of the total mass of the monomer participating in the reaction), isophorone diisocyanate was slowly added dropwise into the reaction system containing polytetrahydrofuran and 30% of 2,2-dimethylolbutanoic acid (the molar ratios of isocyanate radical to hydroxyl were 1.1, 1.2, 1.3, 1.4, 1.5, 1.6, and 1.7, respectively), the reaction temperature was 80° C., and the next step was executed after the –NCO % content in the reaction system reached the theoretical value by using a di-n-butylamine method (the theoretical remaining amount of isocyanate radical≤32%);
(2) The temperature was reduced to 60° C., trimethylolpropane monoallyl ether (accounting for 1% of the total mass of hydroxyl) was slowly added dropwise, and after the —NCO % value was determined to reach the theoretical value (the theoretical remaining amount of isocyanate radical≤12-16%), 2,2-dimethylolbutanoic acid (accounting for 4% of the total mass of hydroxyl) was added to perform a thermal reaction until the —NCO content in the reaction system reached the theoretical value (the theoretical remaining amount of isocyanate radical≤8%);
(3) the temperature was reduced to 50° C., the polyurethane was blocked with butanone oxime (the molar ratio of the remaining isocyanate radical content in the reaction system to the hydroxyl of the added blocking agent is 1.5), NCO % was determined to be≤0.5% and then the next step was executed;
(4) the temperature was reduced to room temperature, triethylamine (neutralization degree: 80%) was added to adjust the reaction pH (pH=7.5±0.5), and deionized water was added according to the solid content of 20% and stirred at a high speed (r=1000 r/min) to be self-emulsified to obtain the waterborne polyurethane self-emulsion.

Preparation of Water Repellant by Reacting Acrylate with Waterborne Polyurethane Self-Emulsion with Carbon-Carbon Double Bonds in Side Chain:

The above waterborne polyurethane emulsion with carbon-carbon double bonds in the side chain was taken and the temperature was raised to 50° C., dodecyl acrylate, butyl acrylate and methyl methacrylate were added dropwise to the polyurethane emulsion according to the molar ratio of 1:1:1 (the mass ratio of the acrylate monomer to the solid content of the polyurethane self-emulsion with carbon-carbon double bonds in the side chain was 1:1), stirred for 15 min (r=4000 r/min) under a high-speed mixer, and then kept standing for 1 h, the temperature was raised to 75° C., a potassium persulfate initiator (accounting for 0.6% of the total mass of acrylate monomer) was slowly added dropwise within 3 hours, and the material was cooled and discharged after holding for 3 h to obtain the polyurethane-acrylate water repellant (WPUA).

Finishing of Fabric by Polyurethane-Acrylate Water Repellant:

By using a padding, drying and curing process, the fabric was emulsified by the water repellant at a padding residual ratio of 70% and a padding concentration of 180 g/L and then pre-dried at a temperature of 100° C. for 3 min and cured and dried at a temperature of 140° C. for 3 min. The relevant parameters of the finished fabric are shown in Table 1.

TABLE 1

Properties of water repellant prepared according to different molar ratios of isocyanate radical to hydroxyl

| | | Different molar ratios of isocyanate radical to hydroxyl | | | | | | |
|---|---|---|---|---|---|---|---|---|
| | | 1.1 | 1.2 | 1.3 | 1.4 | 1.5 | 1.6 | 1.7 |
| Contact angle/° | | — | 158 | 156 | 157 | 154 | 153 | — |
| Hydrostatic pressure resistance/Kpa | | — | 20.9 | 20.7 | 19.9 | 21.0 | 20.6 | — |
| Wear loss/% | | — | 0.82 | 0.81 | 0.79 | 0.83 | 0.80 | — |
| Water vapor transmission/g/(m² · 24 h) | | — | 913 | 920 | 917 | 914 | 915 | — |
| Pilling resistance | | — | Level 5 | Level 5 | Level 5 | Level 5 | Level 5 | — |
| Whiteness | | — | 84 | 83 | 84 | 82 | 85 | — |
| Breaking strength/N | Warp direction | — | 610 | 621 | 617 | 621 | 614 | — |
| | Weft direction | — | 582 | 594 | 587 | 593 | 587 | — |

TABLE 1-continued

Properties of water repellant prepared according to different molar ratios of isocyanate radical to hydroxyl

| | | Different molar ratios of isocyanate radical to hydroxyl | | | | | | |
|---|---|---|---|---|---|---|---|---|
| | | 1.1 | 1.2 | 1.3 | 1.4 | 1.5 | 1.6 | 1.7 |
| Washing resistance/° | 5 | — | 151 | 153 | 152 | 150 | 150 | — |
| | 10 | — | 149 | 151 | 150 | 149 | 149 | — |
| | 15 | — | 148 | 148 | 147 | 146 | 147 | — |
| | 20 | — | 145 | 144 | 146 | 144 | 145 | — |
| | 25 | — | 142 | 141 | 145 | 141 | 143 | — |

Note:
The washing resistance test was carried out according to the 2A test standard in AATCC Test Method 61-2010 Color Fastness to Washing. One soap washing according to the AATCC 2A standard was equivalent to 5 times of washing with an ordinary domestic washing machine; when the ratio of isocyanate radial to hydroxyl was 1.1, the prepolymer was not easy to emulsify, and the isocyanate-terminated polyurethane prepolymer was obtained; when the ratio was 1.7, the molecular weight of the polyurethane prepolymer was too large, the residual-NCO content in the system increases, and more carbamidoes witn strong water repellency were generated by emulsifying with added water, the emulsion particle size was too large, and the storage stability becomes poor.

Hydrophobic effect of product: by comparing the polyurethane acrylate water repellant prepared according to different ratios, when the ratio was 1.1 or 1.7, the prepared polyurethane emulsion was unstable and could not effectively perform a free radical polymerization with acrylate monomers. When the ratio was 1.2-1.6, the water repellant was stable, and has better water repellant effects, and good pilling resistance.

Fastness to washing of product: after the fabric was finished with the water repellant emulsion prepared according to the ratio of 1.2-1.6, the static water contact angle (hydrophobicity) of the fabric after washing, equivalent to 25 times of washing with the domestic washing machine, was higher than 140°, and the hydrophobicity was higher, indicating that the fabric finished with the water repellant prepared by the disclosure has higher fastness to washing.

Hydrophobic effect repeatability of product: the fabric was finished when the molar ratio of isocyanate radical to hydroxyl was 1.2-1.6, after 10 batches of finishing, the static water contact angle of the fabric finished each time had a range error of ±1°, and it could be seen from the contact angle data that the hydrophobic effect repeatability of the fabric was good.

Example 2

Investigation of Effects of Reaction Conditions of Acrylate and Waterborne Polyurethane Self-Emulsion on Water Repellant:

Preparation of Polyurethane Self-Emulsion:

the molar ratio of isocyanate radical to hydroxyl of 1.3 was selected, and other conditions referred to Embodiment 1 to prepare a polyurethane self-emulsion.

Preparation of Water Repellant by Reacting Acrylate with Waterborne Polyurethane Self-Emulsion with Carbon-Carbon Double Bonds in Side Chain:

The above waterborne polyurethane emulsion with carbon-carbon double bonds in the side chain was taken and the temperature was raised to 50° C., the molar ratio of dodecyl acrylate to butyl acrylate to methyl methacrylate was respectively replaced to 2:1:0, 1:2:0, 0:2:1, and 0:1:2 (the mass ratio of the acrylate monomer to the solid content of the polyurethane self-emulsion with carbon-carbon double bonds in the side chain was 1:1), they were added dropwise to the polyurethane emulsion, stirred for 15 min (r=4000 r/min) under a high-speed mixer, and then kept standing for 1 h, the temperature was raised to 75° C., a potassium persulfate initiator (accounting for 0.6% of the total mass of acrylate monomer) was slowly added dropwise within 3 hours, and the material was cooled and discharged after holding for 3 h to obtain the polyurethane-acrylate water repellant (WPUA).

Finishing of Fabric by Polyurethane-Acrylate Water Repellant:

By using a padding, drying and curing process, the fabric was emulsified by the water repellant at a padding residual ratio of 70% and a padding concentration of 180 g/L and then pre-dried at a temperature of 100° C. for 3 min and cured and dried at a temperature of 140° C. for 3 min. The relevant parameters of the finished fabric are shown in Table 2.

TABLE 2

Properties of water repellant prepared by reacting with different acrylate monomers

| | | | | |
|---|---|---|---|---|
| Molar ratios of dodecyl acrylate to butyl acrylate to methyl methacrylate | 2:1:0 | 1:2:0 | 0:2:1 | 0:1:2 |
| Contact angle/° | 156 | 158 | 154 | 157 |
| Hydrostatic pressure resistance/Kpa | 20.8 | 21.0 | 20.9 | 21.1 |
| Wear loss/% | 0.78 | 0.76 | 0.77 | 0.80 |
| Water vapor transmission/ g/(m² · 24 h) | 927 | 930 | 931 | 929 |
| Pilling resistance | Level 5 | Level 5 | Level 5 | Level 5 |
| Whiteness | 82 | 83 | 85 | 81 |
| Breaking strength/N | | | | |
| Warp direction | 678 | 680 | 687 | 681 |
| Weft direction | 625 | 620 | 631 | 627 |
| Washing resistance/° | | | | |
| 5 | 152 | 153 | 152 | 155 |
| 10 | 150 | 151 | 148 | 151 |
| 15 | 149 | 149 | 145 | 147 |
| 20 | 147 | 147 | 143 | 145 |
| 25 | 144 | 143 | 142 | 143 |

Note:
The washing resistance test was carried out according to the 2A test standard in AATCC Test Method 61-2010 Color Fastness to Washing. One soap washing according to the AATCC 2A standard was equivalent to 5 times of washing with an ordinary domestic washing machine.

Hydrophobic effect of product: by comparing the polyurethane acrylate water repellant prepared according to different acrylate monomer ratios, the water repellant was stable, and the finished fabric has better water repellant effects, and good pilling resistance.

Fastness to washing of product: by comparing the polyurethane acrylate water repellant prepared according to different acrylate monomer ratios, the static water contact angle (hydrophobicity) of the fabric after washing, equivalent to 25 times of washing with the domestic washing machine, was higher than 142°, and the hydrophobicity was higher, indicating that the fabric finished with the water repellant prepared by the disclosure has higher fastness to washing.

Hydrophobic effect repeatability of product: by comparing the polyurethane acrylate water repellant prepared according to different acrylate monomer ratios, after 10 batches of finishing, the static water contact angle of the fabric finished each time had a range error of ±1°, and it could be seen from the contact angle data that the hydrophobic effect repeatability of the fabric was good.

Example 3

A polyurethane-acrylate water repellant was prepared according to the following steps and the fabric was finished:
Preparation of Polyurethane-Acrylate Water Repellant:
Preparation of Waterborne Polyurethane Self-Emulsion with Carbon-Carbon Double Bonds in Side Chain:
(1) Polypropylene glycol (Mn=2000, accounting for 79% of the total mass of hydroxyl), 2,2-dimethylolpropionic acid (accounting for 11% of the total mass of hydroxyl), and 7-octene-1,2-diol (accounting for 10% of the total mass of hydroxyl) were dried in vacuum at a temperature of 70° C. to remove water for 3-4 hours. Under the protection of nitrogen, in the presence of dibutyltin dilaurate as a catalyst (accounting for 0.08% of the total mass of the monomer participating in the reaction), p-phenylene diisocyanate was slowly added dropwise into the reaction system containing polypropylene glycol and 30% of 2,2-dimethylolpropionic acid (the molar ratio of isocyanate radical to hydroxyl was 1.3), the reaction temperature was 80° C., and the next step was executed after the —NCO % content in the reaction system reached the theoretical value by using a di-n-butylamine method (the theoretical remaining amount of isocyanate radical≤32%);
(2) the temperature was reduced to 65° C., 7-octene-1,2-diol (accounting for 10% of the total mass of hydroxyl) was slowly added dropwise, and after the —NCO % value was determined to reach the theoretical value (the theoretical remaining amount of isocyanate radical≤12%), 2,2-dimethylolpropionic acid (accounting for 11% of the total mass of hydroxyl) was added to perform a thermal reaction until the —NCO content in the reaction system reached the theoretical value (the theoretical remaining amount of isocyanate radica≤8%);
(3) the temperature was reduced to 60° C., the polyurethane was blocked with n-heptaldehyde oxime (the molar ratio of the remaining isocyanate radical content in the reaction system to the hydroxyl of the added blocking agent was 2), NCO % was determined to be≤0.5% and then the next step was executed;
(4) the temperature was reduced to room temperature, triethylamine (neutralization degree: 100%) was added to adjust the reaction pH (pH=7.5±0.5), and deionized water was added according to the solid content of 40% and stirred at a high speed (r=1600 r/min) to be self-emulsified to obtain the waterborne polyurethane self-emulsion.

Preparation of Water Repellant by Reacting Acrylate with Waterborne Polyurethane Self-Emulsion with Carbon-Carbon Double Bonds in Side Chain:

The above waterborne polyurethane emulsion with carbon-carbon double bonds in the side chain was taken and the temperature was raised to 40° C., octadecyl acrylate, tetradecyl acrylate and methyl methacrylate were added dropwise to the polyurethane emulsion according to 2:1:0 (the mass ratio of the acrylate monomer to the solid content of the polyurethane self-emulsion with carbon-carbon double bonds in the side chain was 4:1), stirred for 20 min (r=5000 r/min) under a high-speed mixer, and then kept standing for 1.5 h, the temperature was raised to 80° C., a potassium persulfate initiator (accounting for 0.8% of the total mass of acrylate monomer) was slowly added dropwise within 4 hours, and the material was cooled and discharged after holding for 2 h to obtain the polyurethane-acrylate water repellant (WPUA).

Finishing of Fabric by Polyurethane-Acrylate Water Repellant:

By using a padding, drying and curing process, the fabric was emulsified by the water repellant at a padding residual ratio of 150% and a padding concentration of 20 g/L and then pre-dried at a temperature of 60° C. for 5 min and cured and dried at a temperature of 160° C. for 1 min. The relevant parameters of the finished fabric are shown in Table 3.

Example 4

A polyurethane-acrylate water repellant was prepared according to the following steps and the fabric was finished:
Preparation of Polyurethane-Acrylate Water Repellant:
Preparation of Waterborne Polyurethane Self-Emulsion with Carbon-Carbon Double Bonds in Side Chain:
(1) Poly-ε-caprolactone glycol (Mn=300, accounting for 80% of the total mass of hydroxyl), 2,2-dimethylolbutanoic acid (accounting for 10% of the total mass of hydroxyl), and 6-heptene-2,4-diol (accounting for 10% of the total mass of hydroxyl) were dried in vacuum at a temperature of 70° C. to remove water for 3-4 h. Under the protection of nitrogen, in the presence of dibutyltin dilaurate as a catalyst (accounting for 0.08% of the total mass of the monomer participating in the reaction), diphenylmethane diisocyanate was slowly added dropwise into the reaction system containing poly-ε-caprolactone glycol and 30% of hydroxymethylpropionic acid (the molar ratio of isocyanate radical to hydroxyl was 1.3), the reaction temperature was 75° C., and the next step was executed when the —NCO % content in the reaction system reached the theoretical value by using a di-n-butylamine method (the theoretical remaining amount of isocyanate radical≤32%);
(2) The temperature was reduced to 60° C., 6-heptene-2,4-diol (accounting for 10% of the total mass of hydroxyl) was slowly added dropwise, and after the —NCO % value was determined to reach the theoretical value (the theoretical remaining amount of isocyanate radical≤14%), 2,2-dimethylolbutanoic acid (accounting for 10% of the total mass of hydroxyl) was added to perform a thermal reaction until the —NCO content in the reaction system reached the theoretical value (the theoretical remaining amount of isocyanate radical≤8%);

(3) the temperature was reduced to 50° C., the polyurethane was blocked with cyclohexanone oxime (the molar ratio of the remaining isocyanate radical content in the reaction system to the hydroxyl of the added blocking agent was 1.8), NCO % was determined to be ≤0.5% and then the next step was executed;

(4) the temperature was reduced to room temperature, triethylamine (neutralization degree: 90%) was added to adjust the reaction pH (pH=7.5±0.5), and deionized water was added according to the solid content of 30% and stirred at a high speed (r=1600 r/min) to be self-emulsified to obtain the waterborne polyurethane self-emulsion.

Preparation of Water Repellant by Reacting Acrylate with Waterborne Polyurethane Self-Emulsion with Carbon-Carbon Double Bonds in Side Chain:

The above waterborne polyurethane emulsion with carbon-carbon double bonds in the side chain was taken and the temperature was raised to 50° C., dodecyl methacrylate and butyl acrylate were added dropwise to the polyurethane emulsion according to 1:2 (the mass ratio of the acrylate monomer to the solid content of the polyurethane self-emulsion with carbon-carbon double bonds in the side chains was 3:1), stirred for 15 min (r=4500 r/min) under a high-speed mixer, and then kept standing for 1 h, the temperature was raised to 75° C., an azobisisobutyronitrile initiator (accounting for 0.7% of the total mass of acrylate monomer) was slowly added dropwise within 3.5 hours, and the material was cooled and discharged after holding for 3 h to obtain the polyurethane-acrylate water repellant (WPUA).

Finishing of Fabric by Polyurethane-Acrylate Water Repellant:

By using a padding, drying and curing process, the fabric was emulsified by the water repellant at a padding residual ratio of 100% and a padding concentration of 120 g/L, and then pre-dried at a temperature of 90° C. for 3 min and cured and dried at a temperature of 140° C. for 2 min. The relevant parameters of the finished fabric are shown in Table 3.

Example 5

A polyurethane-acrylate water repellant was prepared according to the following steps and the fabric was finished:

Preparation of Polyurethane-Acrylate Water Repellant:

Preparation of Waterborne Polyurethane Self-Emulsion with Carbon-Carbon Double Bonds in Side Chain:

(1) polyethyleneglycol adipate glycol (Mn=1500, accounting for 85% of the total mass of hydroxyl), N-methyldiethanolamine (accounting for 10% of the total mass of hydroxyl), and pentaerythritol diacrylate (accounting for 5% of the total mass of hydroxyl) were dried in vacuum at a temperature of 70° C. to remove water for 3-4 h. Under the protection of nitrogen, in the presence of dibutyltin dilaurate as a catalyst (accounting for 0.08% of the total mass of the monomer participating in the reaction), 4,4-diphenylmethane diisocyanate was slowly added dropwise into the reaction system containing polyethyleneglycol adipate glycol and 30% of N-methyldiethanolamine (the molar ratio of isocyanate radical to hydroxyl was 1.3), the reaction temperature was 80° C., and the next step was executed after the —NCO % content in the reaction system reached the theoretical value by using a di-n-butylamine method (the theoretical remaining amount of isocyanate radical≤32%);

(2) the temperature was reduced to 50° C., pentaerythritol diacrylate (accounting for 5% of the total mass of hydroxyl) was slowly added dropwise, and after the —NCO % value was determined to reach the theoretical value (the theoretical remaining amount of isocyanate radical≤14%), N-methyldiethanolamine (accounting for 10% of the total mass of hydroxyl) was added to perform a thermal reaction until the —NCO content in the reaction system reached the theoretical value (the theoretical remaining amount of isocyanate radical≤8%);

(3) the temperature was reduced to 60° C., the polyurethane was blocked with butanone oxime (the molar ratio of the remaining isocyanate radical content in the reaction system to the hydroxyl of the added blocking agent was 1.6), NCO % was determined to be ≤0.5% and then the next step was executed;

(4) the temperature was reduced to room temperature, hydrochloric acid (neutralization degree: 85%) was added to adjust the reaction pH (pH=7.5±0.5), and deionized water was added according to the solid content of 35% and stirred at a high speed (r=1600 r/min) to be self-emulsified to obtain the waterborne polyurethane self-emulsion.

Preparation of Water Repellant by Reacting Acrylate with Waterborne Polyurethane Self-Emulsion with Carbon-Carbon Double Bonds in Side Chain:

The above waterborne polyurethane emulsion with carbon-carbon double bonds in the side chain was taken and the temperature was raised to 45° C., octadecyl acrylate and butyl acrylate were added dropwise to the polyurethane emulsion according to 2:1 (the mass ratio of the acrylate monomer to the solid content of the polyurethane self-emulsion with carbon-carbon double bonds in the side chain was 2:1), stirred for 20 min (r=5000 r/min) under a high-speed mixer, and then kept standing for 1.5 h, the temperature was raised to 80° C., an azobisisobutyronitrile initiator (accounting for 0.6% of the total mass of acrylate monomer) was slowly added dropwise within 4 hours, and the material was cooled and discharged after holding for 2 h to obtain the polyurethane-acrylate water repellant (WPUA).

Finishing of Fabric by Polyurethane-Acrylate Water Repellant:

By using a padding, drying and curing process, the fabric was emulsified by the water repellant at a padding residual ratio of 80% and a padding concentration of 160 g/L and then pre-dried at a temperature of 70° C. for 5 min and cured and dried at a temperature of 150° C. for 4 min. The relevant parameters of the finished fabric are shown in Table 3.

Example 6

A polyurethane-acrylate water repellant was prepared according to the following steps and the fabric was finished:

Preparation of Polyurethane-Acrylate Water Repellant:

Preparation of Waterborne Polyurethane Self-Emulsion with Carbon-Carbon Double Bonds in Side Chain:

Polyethylene glycol (Mn=600, accounting for 90% of the total mass of hydroxyl), diethylenetriamine (accounting for 4% of the total mass of hydroxyl), and glycerol methacrylate (accounting for 6% of the total mass of hydroxyl) were dried in vacuum at a temperature of 70° C. to remove water for 3-4 h. Under the protection of nitrogen, in the presence of dibutyltin dilaurate as a catalyst (accounting for 0.08% of the total mass of the monomer participating in the reaction), m-phenylene diisocyanate was slowly added dropwise into the reaction system containing polyethylene glycol and 30% of diethylenetriamine (the molar ratio of isocyanate radical to hydroxyl was 1.3), the reaction temperature was 70° C., and the next step was executed after the —NCO content in the reaction system reached the theoretical value by using a di-n-butylamine method (the theoretical remaining amount of isocyanate radical≤32%);

(2) The temperature was reduced to 60° C., glycerol methacrylate (accounting for 6% of the total mass of hydroxyl) was slowly added dropwise, and after the —NCO % value was determined to reach the theoretical value (the theoretical remaining amount of isocyanate radical≤14%), diethylenetriamine (accounting for 4% of the total mass of hydroxyl) was added to perform a thermal reaction until the —NCO content in the reaction system reached the theoretical value (the theoretical remaining amount of isocyanate radical≤8%);

(3) the temperature was reduced to 50° C., the polyurethane was blocked with dimethyl glyoxime (the molar ratio of the remaining isocyanate radical content in the reaction system to the hydroxyl of the added blocking agent was 1.5), NCO % was determined to be ≤0.5% and then the next step was executed;

(4) the temperature was reduced to room temperature, hydrochloric acid (neutralization degree: 95%) was added to adjust the reaction pH (pH=7.5±0.5), and deionized water was added according to the solid content of 25% and stirred at a high speed (r=1600 r/min) to be self-emulsified to obtain the waterborne polyurethane self-emulsion.

Preparation of Water Repellant by Reacting Acrylate with Waterborne Polyurethane Self-Emulsion with Carbon-Carbon Double Bonds in Side Chain:

The above waterborne polyurethane emulsion with carbon-carbon double bonds in the side chain was taken and the temperature was raised to 40° C., hexyl acrylate, hexyl methacrylate and octyl methacrylate were added dropwise to the polyurethane emulsion according to 1:1:1 (the mass ratio of the acrylate monomer to the solid content of the polyurethane self-emulsion with carbon-carbon double bonds in the side chain was 3:1), stirred for 15 min (r=5000 r/min) under a high-speed mixer, and then kept standing for 1 h, the temperature was raised to 75° C., a potassium persulfate initiator (accounting for 0.7% of the total mass of acrylate monomer) was slowly added dropwise within 4 hours, and the material was cooled and discharged after holding for 3 h to obtain the polyurethane-acrylate water repellant (WPUA).

Finishing of Fabric by Polyurethane-Acrylate Water Repellant:

By using a padding, drying and curing process, the fabric was emulsified by the water repellant at a padding residual ratio of 70% and a padding concentration of 180 g/L and then pre-dried at a temperature of 60° C. for 5 min and cured and dried at a temperature of 150° C. for 2 min. The relevant parameters of the finished fabric are shown in Table 3.

Comparative Example 1

A block type waterborne polyurethane modified acrylate water repellant was prepared according to the following steps and the fabric was finished:

Preparation of Waterborne Polyurethane Self-Emulsion with Carbon-Carbon Double Bonds at the End:

(1) Polytetrahydrofuran (Mn=850, accounting for 95% of the total mass of hydroxyl), 2,2-dimethylolbutanoic acid (accounting for 4% of the total mass of hydroxyl), and hydroxyethyl acrylate (accounting for 1% of the total mass of hydroxyl) were dried in vacuum at a temperature of 70° C. to remove water for 2-3 h. Under the protection of nitrogen, in the presence of dibutyltin dilaurate as a catalyst (accounting for 0.08% of the total mass of the monomer participating in the reaction), isophorone diisocyanate was slowly added dropwise into the reaction system containing polytetrahydrofuran and 30% of 2,2-dimethylolbutanoic acid (the molar ratio of isocyanate radical to hydroxyl was 1.3), the reaction temperature was 80° C., and the next step was executed after the —NCO content in the reaction system reached the theoretical value by using a di-n-butylamine method (the theoretical remaining amount of isocyanate radical≤32%);

(2) the temperature was reduced to 60° C., 2,2-dimethylolbutanoic acid (accounting for 4% of the total mass of hydroxyl) was slowly added dropwise to perform a thermal reaction until the —NCO content in the reaction system reached the theoretical value (the theoretical remaining amount of isocyanate radical≤8%);

(3) the temperature was reduced to 50° C., the polyurethane was blocked with hydroxyethyl acrylate (the molar ratio of the remaining isocyanate radical content in the reaction system to the hydroxyl of the added blocking agent was 1.5), NCO % was determined to be ≤0.5% and then the next step was executed;

(4) the temperature was reduced to room temperature, triethylamine (neutralization degree: 80%) was added to adjust the reaction pH (pH=7.5±0.5), and deionized water was added according to the solid content of 20% and stirred at a high speed (r=1000 r/min) to be self-emulsified to obtain the waterborne polyurethane self-emulsion.

Preparation of Water Repellant by Reacting Acrylate with Waterborne Polyurethane Self-Emulsion with Carbon-Carbon Double Bonds in Side Chain:

The above waterborne polyurethane emulsion with carbon-carbon double bonds in the side chain was taken and the temperature was raised to 50° C., dodecyl acrylate, butyl acrylate and methyl methacrylate were added dropwise to the polyurethane emulsion according to 1:1:1 (the mass ratio of the acrylate monomer to the solid content of the polyurethane self-emulsion with carbon-carbon double bonds in the side chain was 1:1), stirred for 15 min (r=4000 r/min) under a high-speed mixer, and then kept standing for 1 h, the temperature was raised to 75° C., a potassium persulfate initiator (accounting for 0.6% of the total mass of acrylate monomer) was slowly added dropwise within 3 hours, and the material was cooled and discharged after holding for 3 h to obtain the polyurethane-acrylate water repellant (WPUA).

Finishing of Fabric by Polyurethane-Acrylate Water Repellant:

By using a padding, drying and curing process, the fabric was emulsified by the water repellant at a padding residual ratio of 70% and a padding concentration of 180 g/L and then pre-dried at a temperature of 100° C. for 3 min and cured and dried at a temperature of 140° C. for 3 min. The relevant parameters of the finished fabric are shown in Table 3.

Comparative Example 2

A grafted waterborne polyurethane modified acrylate water repellant was prepared according to the following steps and the fabric was finished:

Preparation of Waterborne Polyurethane Self-Emulsion with Carbon-Carbon Double Bonds in Main Chain:

(1) Polytetrahydrofuran (Mn=850, accounting for 95% of the total mass of hydroxyl), 2,2-dimethylolbutanoic acid (accounting for 4% of the total mass of hydroxyl), and butenediol (accounting for 1% of the total mass of hydroxyl) were dried in vacuum at a temperature of 70° C. to remove water for 2-3 h. Under the protection of nitrogen, in the presence of dibutyltin dilaurate as a catalyst (accounting for 0.08% of the total mass of the monomer participating in the reaction), isophorone diisocyanate was slowly added dropwise to polytetrahydrofuran and 30% of 2,2-dimethylolbutanoic acid (the molar ratio of isocyanate radical to hydroxyl was 1.3), the reaction temperature was 80° C., and the next step was executed after the —NCO content in the reaction system reached the theoretical value by using a di-n-butylamine method (the theoretical remaining amount of isocyanate radical≤32%);

(2) The temperature was reduced to 60° C., butenediol (accounting for 1% of the total mass of hydroxyl) was slowly added dropwise, and after the —NCO % value was determined to reach the theoretical value (the theoretical remaining amount of isocyanate radical≤14%), 2,2-dimethylolbutanoic acid (accounting for 4% of the total mass of hydroxyl) was added to perform a thermal reaction until the —NCO content in the reaction system reached the theoretical value (the theoretical remaining amount of isocyanate radical≤8%);

(3) the temperature was reduced to 50° C., the polyurethane was blocked with butanone oxime (the molar ratio of the remaining isocyanate radical content in the reaction system to the hydroxyl of the added blocking agent is 1.5), the NCO % was determined to be ≤0.5% and then the next step was executed;

(4) the temperature was reduced to room temperature, triethylamine (neutralization degree: 80%) was added to adjust the reaction pH (pH=7.5±0.5), and deionized water was added according to the solid content of 20% and stirred at a high speed (r=1000 r/min) to be self-emulsified to obtain the waterborne polyurethane self-emulsion.

Preparation of Water Repellant by Reacting Acrylate with Waterborne Polyurethane Self-Emulsion with Carbon-Carbon Double Bonds in Main Chain:

The above waterborne polyurethane emulsion with carbon-carbon double bonds in the main chain was taken and the temperature was raised to 50° C., dodecyl acrylate, butyl acrylate and methyl methacrylate were added dropwise to the polyurethane emulsion according to 1:1:1 (the mass ratio of the acrylate monomer to the solid content of the polyurethane self-emulsion with carbon-carbon double bonds in the side chain was 1:1), stirred for 15 min (r=4000 r/min) under a high-speed mixer, and then kept standing for 1 h, the temperature was raised to 75° C., a potassium persulfate initiator (accounting for 0.6% of the total mass of acrylate monomer) was slowly added dropwise within 3 hours, and the material was cooled and discharged after holding for 3 h to obtain the polyurethane-acrylate water repellant (WPUA).

Finishing of Fabric by Polyurethane-Acrylate Water Repellant:

By using a padding, drying and curing process, the fabric was emulsified by the water repellant at a padding residual ratio of 70% and a padding concentration of 180 g/L and then pre-dried at a temperature of 100° C. for 3 min and cured and dried at a temperature of 140° C. for 3 min. The relevant parameters of the finished fabric are shown in Table 3.

Comparative Example 3

Referring to Embodiment 6, other conditions remained unchanged, and the dihydroxy-containing double bond monomer was replaced with 1,5-hexadiene-3,4-diol to prepare a hydrophobic fabric. Relevant test results are shown in Table 3.

TABLE 3

Relevant parameters of fabrics finished with different water repellant

| | | Example 3 | Example 4 | Example 5 | Example 6 | Comparative Example 1 | Comparative Example 2 | Comparative Example 3 |
|---|---|---|---|---|---|---|---|---|
| Contact angle/° | | 157 | 158 | 154 | 156 | 135 | 140 | 145 |
| Hydrostatic pressure resistance (Kpa) | | 20.8 | 21.0 | 20.9 | 20.7 | 18.4 | 19.0 | 19.5 |
| Wear loss (%) | | 0.79 | 0.72 | 0.78 | 0.80 | 2.1 | 1.6 | 1.2 |
| Water vapor transmission g/(m$^2$ · 24 h) | | 930 | 928 | 921 | 924 | 706 | 821 | 843 |
| Pilling resistance | | Level 5 | Level 5 | Level 5 | Level 5 | Level 3 | Level 4 | Level 4 |
| Whiteness | | 81 | 82 | 84 | 87 | 65 | 72 | 75 |
| Breaking strength (N) | Warp direction | 678 | 676 | 690 | 684 | 521 | 621 | 680 |
| | Weft direction | 623 | 619 | 617 | 624 | 501 | 598 | 600 |
| Washing resistance (°) | 5 | 154 | 154 | 153 | 154 | 130 | 138 | 140 |
| | 10 | 151 | 153 | 150 | 151 | 125 | 137 | 138 |
| | 15 | 150 | 150 | 149 | 148 | 120 | 135 | 134 |
| | 20 | 148 | 147 | 146 | 145 | 118 | 132 | 131 |
| | 25 | 145 | 143 | 144 | 143 | 115 | 131 | 130 |

Note:
The washing resistance test was carried out according to the 2A test standard in AATCC Test Method 61-2010 Color Fastness to Washing. One soap washing according to the AATCC 2A standard was equivalent to 5 times of washing with an ordinary domestic washing machine.

Hydrophobic effect of product: the disclosure introduced carbon-carbon double bonds in the polyurethane side chain by using the double carbon-carbon double bond-containing dihydroxy micromolecular chain extender (Embodiments 1-6), and compared with the introduction of carbon-carbon double bonds at the polyurethane end (Comparative Example 1) and the introduction of carbon-carbon double bonds inside the polyurethane main chain (Comparative Example 2 and Comparative Example 3), the water repellant prepared according to the steps of Embodiments 1-6 was more stable, and the finished fabric had better water repellant effects, and good pilling resistance.

Fastness to washing of product: by comparing the polyurethane acrylate water repellant prepared according to different acrylate monomer ratios in Embodiments 1-6, the static water contact angle (hydrophobicity) of the fabric after washing, equivalent to 25 times of washing with domestic washing machines, was higher than 142°, and the hydrophobicity was higher, indicating that the fabric finished with the water repellant prepared by the disclosure has higher fastness to washing.

the side chain and an acrylate monomer under the condition of an initiator to obtain the polyurethane-acrylate water repellant,

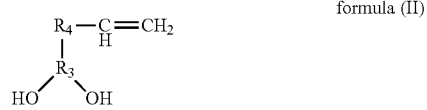

formula (II)

wherein the polyurethane-acrylate water repellant comprises carbon-carbon double bonds introduced in a polyurethane side chain, and has the structure in formula (I):

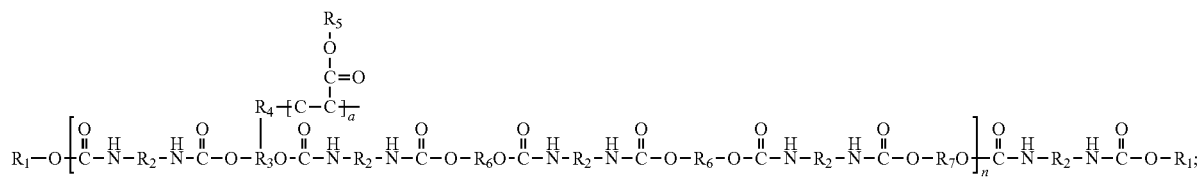

formula (I)

Hydrophobic effect repeatability of product: by comparing the polyurethane acrylate water repellant prepared according to different acrylate monomer ratios Embodiments 1-6, after 10 batches of finishing, the static water contact angle of the fabric finished each time had a range error of ±1°, and it could be seen from the contact angle data that the hydrophobic effect repeatability of the fabric was good.

Only preferred implementations of the disclosure are described above. It should be noted that for those of ordinary skill in the art, several improvements and modifications can be made without departing from the principles of the disclosure. These improvements and modifications should also be regarded as the protection scope of the disclosure.

What is claimed is:

1. A method for preparing a polyurethane-acrylate water repellant, comprising:
   (a) preparing a polyurethane prepolymer by using diisocyanate, a part of a hydrophilic chain extender and a polymer polyol;
   (b) continuously reacting the polyurethane prepolymer with a double carbon-carbon double bond-containing dihydroxy micromolecular chain extender and the remaining hydrophilic chain extender for a period of time to obtain a waterborne polyurethane emulsion with carbon-carbon double bonds in the side chain, the double carbon-carbon double bond-containing dihydroxy micromolecular chain extender being a compound with the following formula (II);
   (c) adding an oxime blocking agent to block an isocyanate radical (NCO %≤0.5%);
   (d) cooling, and adding a neutralizer to adjust pH to 7 to 8.5;
   (e) adding deionized water for emulsification to obtain a waterborne polyurethane emulsion with carbon-carbon double bonds in a side chain; and
   (f) performing a free radical polymerization of the polyurethane emulsion with carbon-carbon double bonds in and wherein:
   $R_1$ is an oxime blocking group;
   $R_2$ is derived from a diisocyanate monomer;
   $R_3$ is selected from alkyl, phenyl, a cyclic group, acyl, an ester group, carbonyl, and an ether group having any number of carbon atoms;
   $R_4$ is selected from alkyl, a cyclic group and its derivatives, and phenyl and its derivatives;
   $R_5$ is a carbon chain having 1 to 18 carbon atoms;
   $R_6$ is derived from polyether or polyol polyorganic compounds;
   $R_7$ is derived from a hydrophilic chain extender; and
   a and n are natural numbers of 1 to 100.

2. The method according to claim 1, wherein the carbon-carbon double bond-containing dihydroxy micromolecular chain extender comprises any one or a mixture of 7-octene-1,2-diol, pentaerythritol diacrylate, 6-heptene-2,4-diol, 3-allyloxy-1,2-propanediol, glycerol methacrylate, trimethylolpropane monoallyl ether, 2,2-bishydroxymethylbutanoic acid-3-hydroxy-2-(2-methacryloyloxy)-propyl ester, and 2-(3-isocyanatomethyl)-3,5,5-trimethylcyclohexylcarbamoyloxy)ethyl acrylate.

3. The method according to claim 1, wherein in step (a), a molar ratio of the isocyanate radical to hydroxyl of the polyurethane prepolymer is 1.1-1.7.

4. The method according to claim 2, wherein in step (a), a molar ratio of the isocyanate radical to hydroxyl of the polyurethane prepolymer is 1.1 to 1.

5. The method according to claim 1, wherein in step (a), the hydrophilic chain extender accounts for 4% to 11% of total mass of the monomer.

6. The method according to claim 2, wherein in step (b), the carbon-carbon double bond-containing dihydroxy micromolecular chain extender accounts for 1% to 10% of total mass of the monomer.

7. The method according to claim 1, wherein in step (e), the emulsification is obtained by adding water according to a solid content of 20% to 40% and stirring.

8. The method according to claim 2, wherein in step (e), emulsification is obtained by adding water according to a solid content of 20% to 40% and stirring.

9. The method according to claim 3, wherein in step (e), emulsification is obtained by adding water according to a solid content of 20% to 40% and stirring.

10. The method according to claim 4, wherein in step (e), emulsification is obtained by adding the water according to a solid content of 20% to 40% and stirring.

11. The method according to claim 5, wherein in step (e), emulsification is obtained by adding the water according to a solid content of 20% to 40% and stirring.

12. The method according to claim 6, wherein in step (e), emulsification is obtained by adding water according to a solid content of 20% to 40% and stirring.

13. The method according to claim 1, wherein in step (f), a mass ratio of the acrylate monomer to the solid content of polyurethane self-emulsion with carbon-carbon double bonds in the side chain is (1 to 4):1.

14. A hydrophobic fabric, prepared by a process comprising the steps of:
impregnating a fabric in a finishing liquid comprising a polyurethane-acrylate water repellant, and
padding, drying, and curing the fabric to obtain the hydrophobic fabric,
wherein the polyurethane-acrylate water repellant comprises carbon-carbon double bonds introduced in a polyurethane side chain, and has the structure in formula (I):

formula (I)

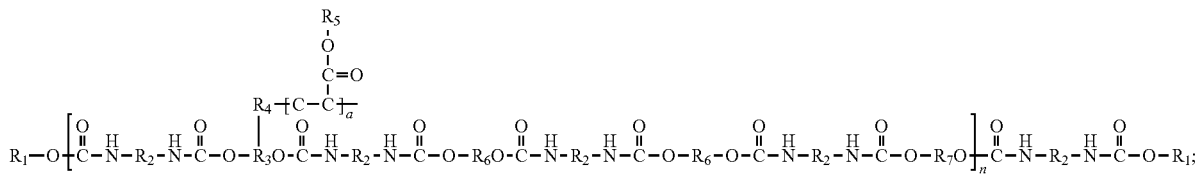

and wherein:
$R_1$ is an oxime blocking group;
$R_2$ is derived from a diisocyanate monomer;
$R_3$ is selected from alkyl, phenyl, a cyclic group, acyl, an ester group, carbonyl, and an ether group having any number of carbon atoms;
$R_4$ is selected from alkyl, a cyclic group and its derivatives, and phenyl and its derivatives;
$R_5$ is a carbon chain having 1 to 18 carbon atoms;
$R_6$ is derived from polyether or polyol polyorganic compounds;
$R_7$ is derived from a hydrophilic chain extender; and
a and n are natural numbers of 1 to 100.

* * * * *